United States Patent [19]
Whittington

[11] Patent Number: 5,505,295
[45] Date of Patent: Apr. 9, 1996

[54] RECYCLING SYSTEMS AND METHODS FOR OIL AND OIL FILTERS

[76] Inventor: C. Wendell Whittington, 1315 Village Oaks La., Lawrenceville, Ga. 30243

[21] Appl. No.: 317,414

[22] Filed: Oct. 3, 1994

Related U.S. Application Data

[63] Continuation of Ser. No. 98,583, Jul. 27, 1993, abandoned.

[51] Int. Cl.⁶ .................................................. B65D 69/00
[52] U.S. Cl. ........................... 206/223; 220/571; 220/572; 220/573; 141/86; 184/106
[58] Field of Search ...................... 206/223, 229, 206/477, 483, 493, 565; 220/86.1, 573, 514, 516, 518, 519, 572, 571; 184/1.5, 106; 141/86, 98, 326; 222/568

[56] References Cited

U.S. PATENT DOCUMENTS

| | | | |
|---|---|---|---|
| Re. 34,133 | 11/1992 | Thorne | 220/23.6 |
| 1,761,072 | 4/1927 | Dohrmann | 222/568 |
| 2,556,627 | 6/1951 | Miksis | 222/568 |
| 3,058,633 | 10/1962 | Muhlhoff | 222/568 |
| 3,410,438 | 11/1968 | Bartz | 220/573 |
| 3,703,956 | 11/1972 | Oswalt | 206/223 |
| 3,802,592 | 4/1974 | Wheaton, III | 220/516 |
| 4,010,863 | 3/1977 | Ebel | 220/573 |
| 4,170,294 | 10/1979 | Zelinski | 206/493 |
| 4,296,838 | 10/1981 | Cohen | 206/223 |
| 4,301,841 | 11/1981 | Sandow | 141/98 |
| 4,403,692 | 9/1983 | Pollacco | 141/98 |
| 4,488,584 | 12/1984 | Hestehave et al. | 206/223 |
| 4,533,042 | 8/1985 | Pollacco | 206/223 |
| 4,572,386 | 2/1986 | Marcus | 222/568 |
| 4,640,431 | 2/1987 | Harrison | 220/573 |
| 4,669,609 | 6/1987 | Lugo | 206/229 |
| 4,673,081 | 6/1987 | Habig et al. | 206/223 |
| 4,756,411 | 7/1988 | Garland | 206/223 |
| 4,802,599 | 2/1989 | Hill | 220/573 |
| 4,815,591 | 3/1989 | Tivy | 206/223 |
| 4,823,947 | 4/1989 | Gust | 206/223 |
| 4,921,147 | 5/1990 | Poirier | 222/568 |
| 5,092,457 | 3/1992 | Islava et al. | 206/223 |
| 5,092,498 | 3/1992 | Willems et al. | 222/568 |
| 5,115,937 | 5/1992 | Chausse et al. | 220/519 |
| 5,291,921 | 3/1994 | Devine | 220/571 |

*Primary Examiner*—David T. Fidei

[57] ABSTRACT

A system that comprises a container capable of holding motor oil and a housing that is capable of holding a first oil filter such that motor oil in the first oil filter can drain into the container. The container is comprised of a light to medium weight durable plastic that is recyclable, such as polyethylene, and preferably has a rectangular top surface with four sides. The rectangular top surface has at least two handles (i.e., indention handles) positioned on opposite sides of the rectangular top surface. The container also has a drain release cap along with a screw and nipple combination to secure motor oil in the container and empty motor oil from the container. At least one drain hole is positioned to drain motor oil from the first oil filter held by the housing into the container.

35 Claims, 3 Drawing Sheets

RECYCLING SYSTEMS AND METHODS FOR OIL AND OIL FILTERS

This application is a continuation of application Ser. No. 08/098,583, filed Jul. 27, 1994, now abandoned.

PARTIAL WAIVER OF COPYRIGHT PURSUANT TO 1077 O.G. 22 (Mar. 20, 1987)

(C) Copyright, C. Wendell Whittington 1993. All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

FIELD OF INVENTION

The present invention relates generally to filter oil recycling systems and methods and, more particularly, but not by way of limitation, relates to systems and methods to manage the waste stream from do-it-yourselfers in non-industrial settings, which enables them to easily transport used goods to recycling centers.

BACKGROUND

The dumping of used motor oil and used oil filters from internal combustion engines in modern vehicles, such as automobiles, airplanes, trucks, etc., is a major environmental hazard in modern society. Governmental reports estimate that at least 200 million gallons of oil are dumped in our nation's environment every year. In Texas alone, experts estimate that approximately 50 million oil filters are generated each year from internal combustion engines alone and they could, if improperly handled, release more than 3 million gallons of oil into the environment each year. If these numbers are expanded nationwide, we estimate that with over 190 million cars on the road, approximately 6 oil changes per car per year would generate 1.14 billion filters on a national level, which needs to be properly disposed. As a result, 96 million gallons of used motor oil need to be properly recycled as well. Similarly, used oil filters are currently filling up our land fills. Moreover, even if used motor oil and used oil filters (which contain used motor oil) are deposited in dumps and landfills, landfills leak and used motor oil still ends up polluting our environment. It is expensive as well; the EPA says cleaning a single landfill costs $20 million to $30 million a year (See "Erodes Support for Clinton's Budget," Wall Street, Jun. 18, 1993). What is even more frustrating is that used motor oil and used oil filters are recyclable and reusable. In particular, used motor oil is recyclable and is used for industrial fuel oils and the paper and aluminum in used oil filters is recyclable and reused as well in our industrialized society. So, not only are we polluting our nation with used oil filters and used motor oil, we are polluting it unnecessarily.

Congress and the Environmental Protection Agency recognizes this problem, which is why they prohibited disposing used internal combustion engine oil filters in landfills, unless, inter alia, these filters have been processed to remove all free waste oil. (See, Environmental Regulations, 16 Tex. Reg. 6566 § 325.137 Prohibited Wastes).

Part of the problem is that there are not any simple ways to remove used motor oil from used oil filters and collect the used oil and used oil filters for proper disposal and/or recycling on a small or large-scale basis.

SUMMARY OF THE INVENTIONS

A system that comprises a container capable of holding motor oil and a housing that is capable of holding a first oil filter so that motor oil in the first oil filter can drain into the container. The container is comprised of a light to medium weight durable plastic that is recyclable, such as polyethylene, and preferably has a rectangular top surface with four sides. The rectangular top surface has at least two handles (i.e., indention handles) positioned on opposite sides of the rectangular top surface. The container also has a drain release cap and extended, flexible nozzle 17 along with a screw and nipple combination to secure motor oil in the container and empty motor oil from the container. Preferred embodiments have at least one drain hole positioned to drain motor oil from the first oil filter held by the housing into the container. In addition, the housing preferably has a curved upper lip to prevent motor oil from splashing out of the housing. The housing can also be designed to hold a second oil filter and has at least one notch positioned to hold the first and second oil filters firmly in place. In this second preferred embodiment, the housing has at least one drain hole positioned to drain motor oil from the second oil filter held by the housing into the container and also has at least one notch positioned to hold the first and second oil filters firmly in place over the respective drain holes. The container in this second embodiment is approximately 24 inches by 18 inches and is capable of holding up to 5.8 gallons. An additional storage compartment can also be added to house items, such as air filters, PVC filters, tools, rags, spark plugs, new quarts of oil, and any combination thereof.

The advantages are that it enables the do-it-yourselfers to collect used motor oil and oil filters from internal combustion engines in their automobiles, airplanes, motor boats, etc. and transport to recycling centers. In particular, this invention provides a convenient and efficient means to collect and store used filters, used air filters and PVC filters, used motor oil, and used 5 quart containers. It is flexible to handle a wide range of different container capacities along with filter holders to meet different needs of each individual. Moreover, the corresponding advantages of this invention pertain to the preservation of the environment. It provides a way that used oil filters and used motor oil can be stored and recycled, as opposed to being dumped in our environment or in already crowded land fills. In sum, the advantages of this invention materially enhance the quality of the environment of mankind by contributing to the restoration or maintenance of the basic life-sustaining natural elements—air, water, and soil.

BRIEF DESCRIPTION OF THE DRAWINGS

Further features and advantages will become apparent from the following and more particular description of the various embodiments of the invention, as illustrated in the accompanying drawings, wherein.

DETAILED DESCRIPTION OF THE PREFERRED EMBODIMENTS

Figure 1A:
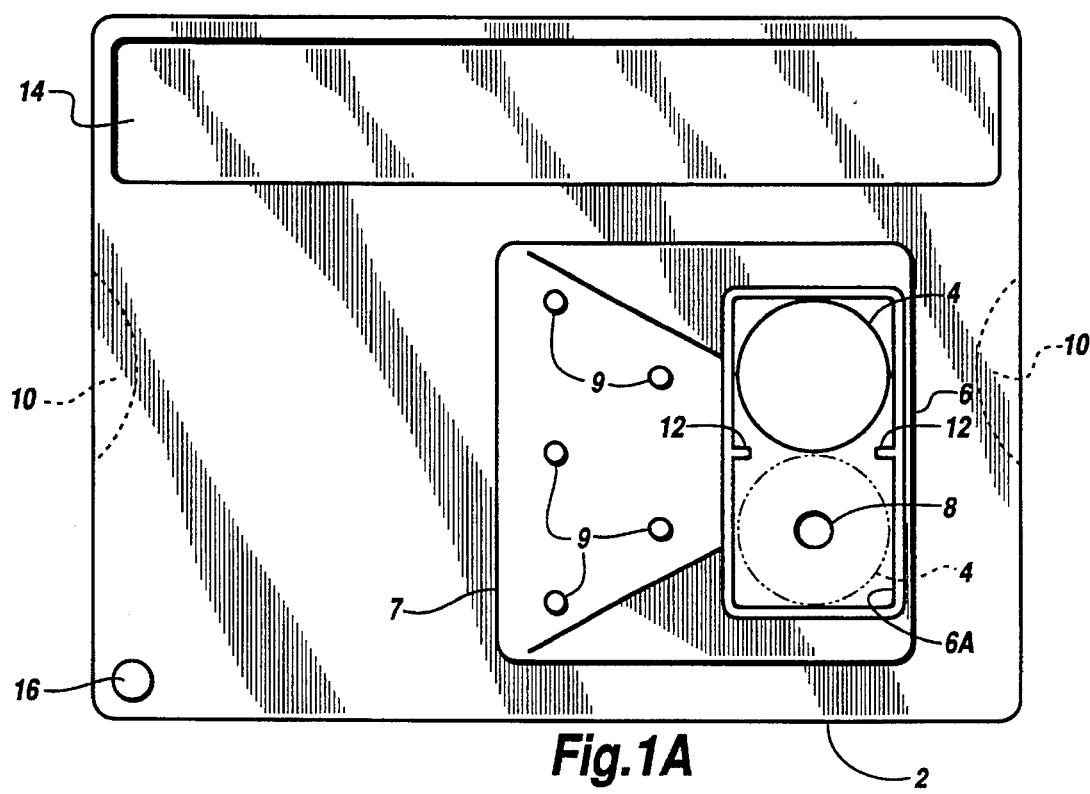
FIG. 1A is an illustration of a top view of a preferred embodiment of the filter oil recycling system.

FIG. 1A is an illustration of a top view of a preferred embodiment of the filter oil recycling system.

Figure 1B:
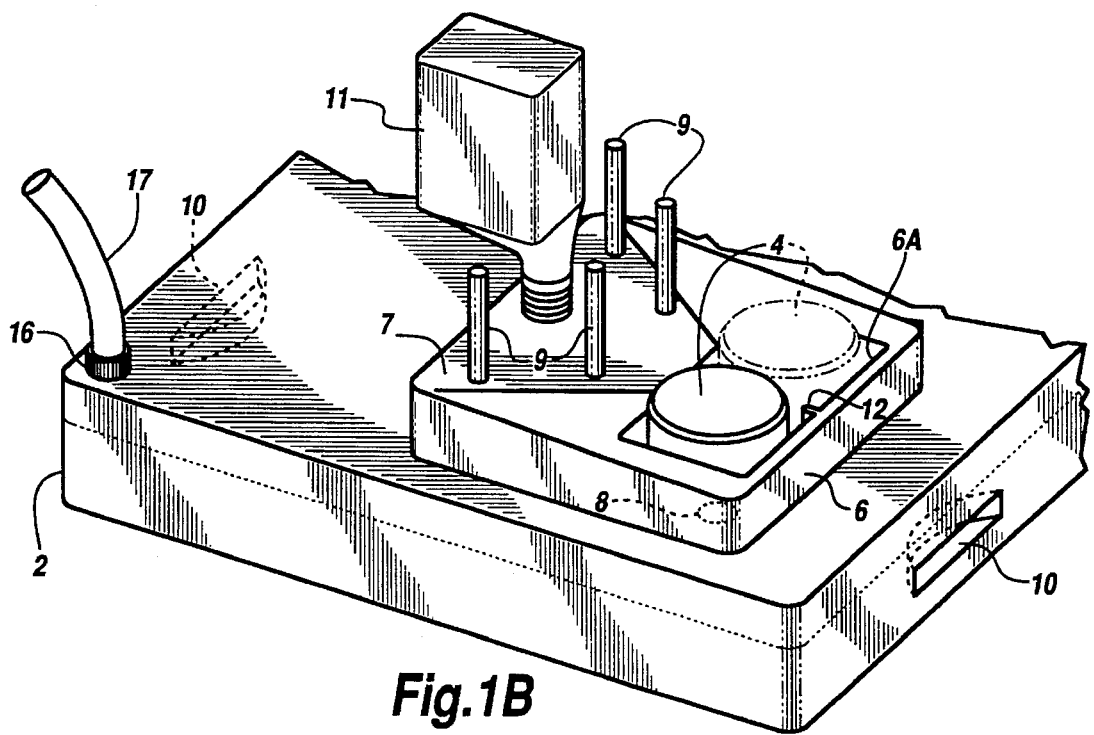
FIGURE 1B is an illustration of a side view of a preferred embodiment of the filter oil recycling system.

FIGURE 1B is an illustration of a side view of a preferred embodiment of the filter oil recycling system. In particular, container 2 holds used motor oil drained from oil filter 4, which is preferably placed upside down in oil filter holder 6. In this fashion, used motor oil 12 (see FIGURE 1B) is drained from oil filter 4 through drain hole 8. Container 2 is 24 inches by 18 inches and holds up to 5.8 gallons of used motor oil 14. Container 2 is comprised of a light to medium weight durable plastic, which permits easy handling and storage. Container 2 preferably has handles 10 to carry container 2 easily and securely. In particular, these handles 10 are preferably 2 inches by 4 inches indention handles, which do not protrude unnecessarily. Oil filter holder 6 is comprised of a 7 inches by 3⅝ inches rectangular opening to house oil filters 4, so that oil can drain from the oil filters 4 through drain hole 8 into container 2. Drain hole 8 is approximately 1 inch in diameter and allows used motor oil to drain products easily. These dimensions are designed to secure up to two oil filters 4 in the proper position to provide a 12 hour to 24 hour drain, which has been deemed necessary to provide adequate drainage of used motor oil from oil filter 4. Two slip notches 12 protrude from an inner wall 6A of oil filter holder 6 in a preferred embodiment. Slip notches 12 are designed to separate two oil filters 4 (please note that FIG. 1A does not actually show two oil filters 4 in order to illustrate drain hole 8) and secure oil filter 4 to prevent oil filter 4 from turning over or moving around if necessary. The presence of oil filter 4 over drain hole 8 is designed to prohibit splash or spillage of used motor oil 14 during transportation to recycling centers. In addition, holder 6 also has additional drainage capacity 7 for emptying plastic containers on rods 9, which also is curved to catch motor oil as it is drained from the engine. Plastic oil container 11 that house new motor oil are placed upside-down on rods 9 to drain unused excess motor oil into container 2. Preferred embodiments of container 2 have an optional storage compartment 14 as well, which is approximately 24 inches by 4 inches. Storage compartment 14 secures air and PVC filters. Storage compartment 14 also can be versatile for carrying tools, spark plugs, used plastic containers that house new motor oil (i.e., high density polyethylene plastic containers), hand cleaner, and rags for easy and quick cleaning. Drain release cap 16 with a screw and nipple combination secures contents in container 2 and also empties motor oil 14 from container 2. Drain release cap 16 is approximately ½ inch in diameter. Alternate preferred embodiments have dimensions of 17 inches by 10 inches and are designed to hold 2.9 gallons of used motor oil container, which are easier to carry.

Figure 2:
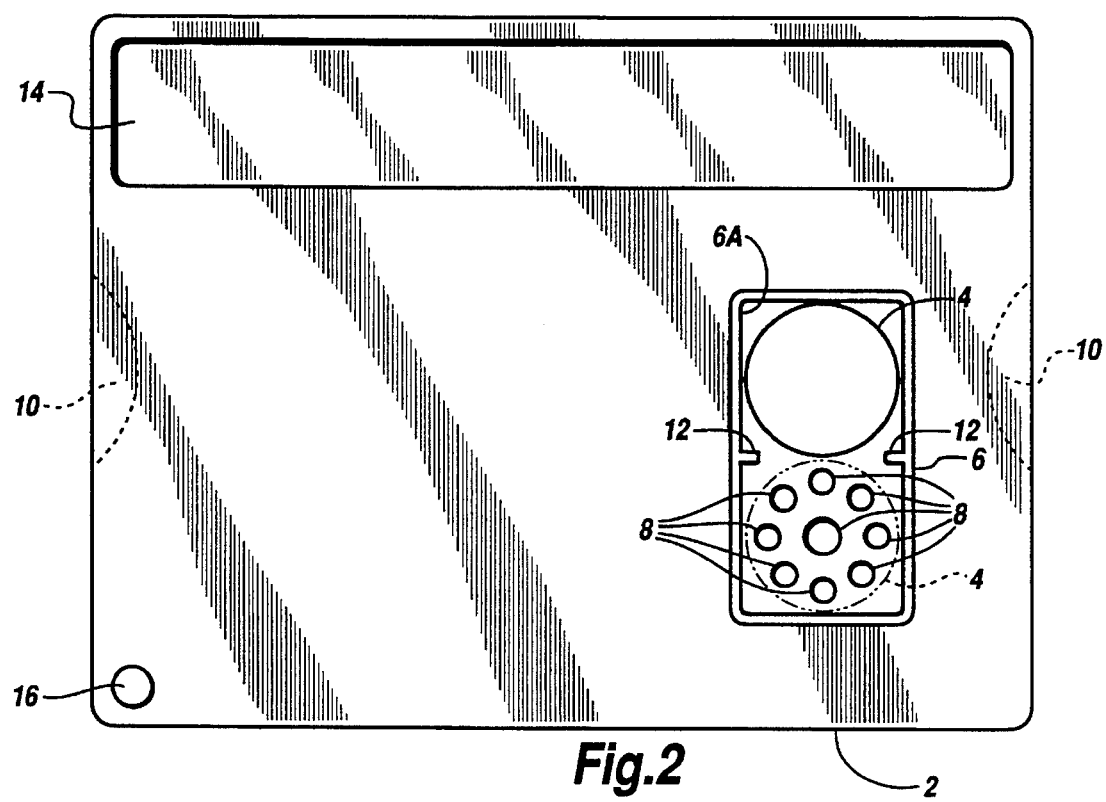
FIG. 2 is an illustration of a top view of a first alternate preferred embodiment of the filter oil recycling system.

FIG. 2 is an illustration of a top view of a first alternate preferred embodiment of the filter oil recycling system. Please note that a plurality of drain holes 8 are used to provide for easier draining of the used motor oil 14 from oil filters 4.

Figure 3:
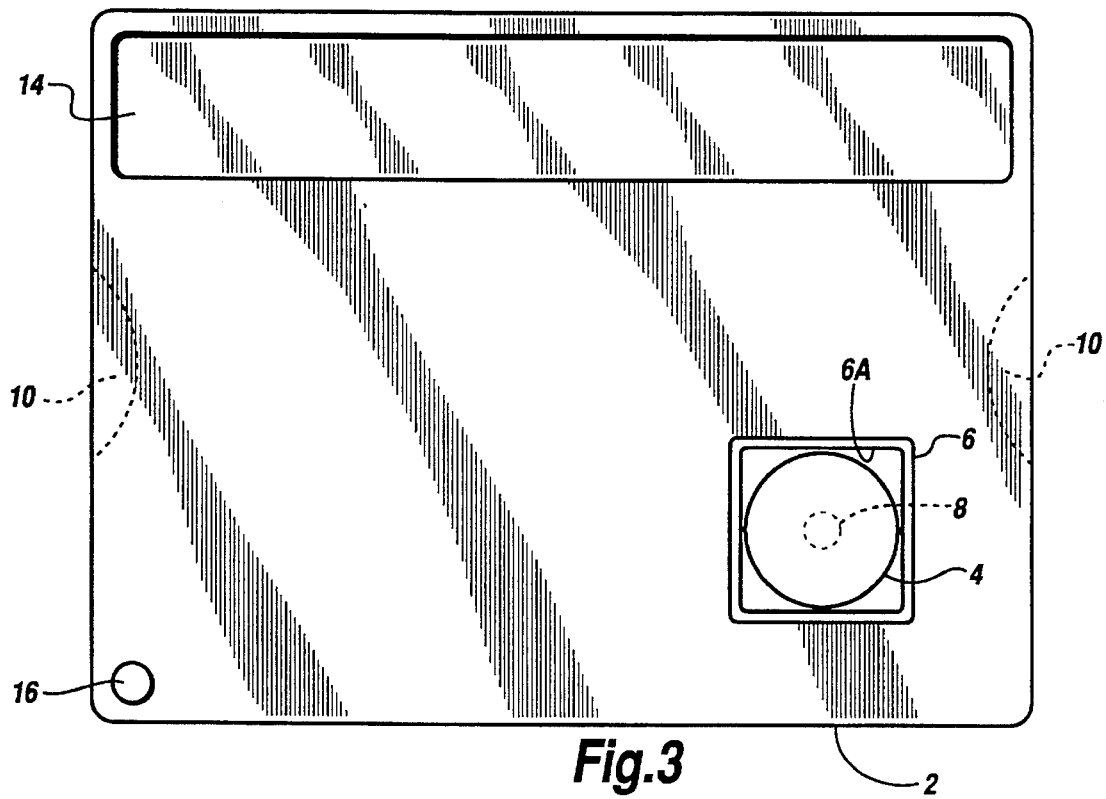
FIG. 3 is an illustration of a top view of a second alternate preferred embodiment of the filter oil recycling system.

FIG. 3 is an illustration of a top view of a second alternate preferred embodiment of the filter oil recycling system. Please note that it only includes one oil filter holder 6 for oil filter 4.

Figure 4:
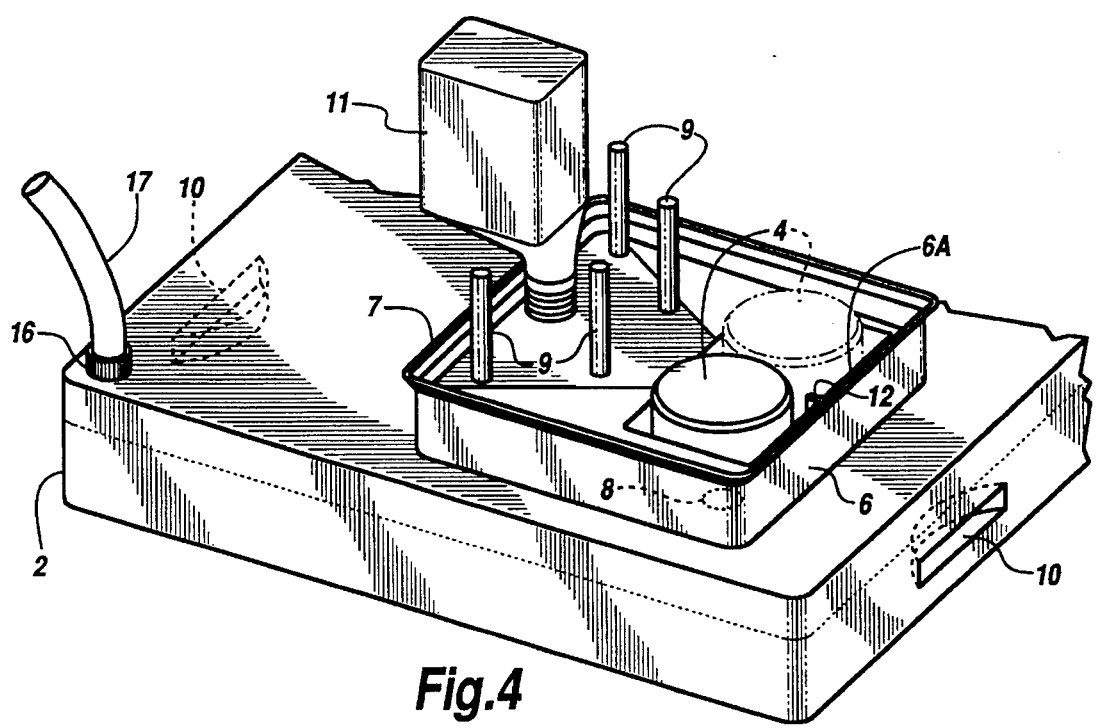
FIG. 4 is an illustration of a side view of an alternate preferred embodiment of the filter oil recycling system, which clearly shows the cured upper lip 6A of housing 6, which is joined with additional draining capacity 7.

FIG. 4 is an illustration of a side view of an alternate preferred embodiment of the filter oil recycling system, which clearly shows the curved upper lip 6A of housing 6, which is joined with additional draining capacity 7.

FURTHER MODIFICATIONS AND VARIATIONS

Although the invention has been described with reference to a specific embodiment, this description is not meant to be construed in a limiting sense. As described above, various modifications of the disclosed embodiment as well as alternate embodiments of the invention will become apparent to persons skilled in the art upon reference to the description of the invention. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

What is claimed is:

1. A system, comprising
   (a) a container having a container interior volume for holding motor oil; and
   (b) a housing adjoining said container, said housing having interior surfaces defining a housing interior volume, said interior surfaces forming at least two recesses, each recess having a cross-sectional area that is slightly larger than an oil filter and a depth sufficiently deep to secure said oil filter in place, said housing having at least one drain hole positioned in said interior surfaces physically linking said housing interior volume to said container interior volume, said housing holding said oil filter in a position to encourage said motor oil in said oil filter to drain from said oil filter held by said housing in said housing interior volume through said at least one drain hole into said container interior volume of said container, said interior surfaces having a securing structure affixed thereto to prevent movement of said oil filter.

2. The system of claim 1, wherein said container is comprised of a light to medium weight durable plastic that is recyclable.

3. The system of claim 2, wherein said container is comprised of polyethylene.

4. The system of claim 1, wherein said housing has a perimeter and a curved upper lip extending substantially around said perimeter to prevent motor oil from splashing out of said housing.

5. The system of claim 1, wherein said container has a substantially rectangular top surface with four sides, said substantially rectangular top surface with four sides having at least two handles positioned on opposite sides of said substantially rectangular top surface with four sides.

6. The system of claim 5, wherein said at least two handles are indention handles.

7. The system of claim 1, wherein said securing structure comprises at least one notch extending from said interior surfaces, said at least one notch positioned to hold said oil filter firmly in place when said oil filter is placed in one recess of said recesses.

8. The system of claim 7, wherein said container is 24 inches by 18 inches and holds at least 5.8 gallons.

9. The system of claim 1, further comprising an additional storage compartment adjoining said container to house items selected from the group consisting of air filters, PVC filters, tools, rags, spark plugs, and new quarts of oil.

10. The system of claim 1, further comprising a drain release cap covering an opening in said container and a flexible nozzle extending from said container to extend said opening and a screw and nipple combination to secure said motor oil in said interior container volume and to empty said motor oil from said interior container volume.

11. A recycling apparatus for used motor oil and used filters, comprising
   (a) a recyclable container having a container interior volume to hold motor oil;
   (b) an oil filter holder attached to said recyclable container, said oil filter having a plurality of interior surfaces defining a first holder interior volume and a second holder interior volume, said plurality of interior surfaces forming a plurality of recesses, said oil filter holder and said recyclable container having at least one drain hold positioned therein physically linked to said container interior volume, each of said first holder interior volume and said second holder interior volume shaped to hold an oil filter in a position to encourage motor oil in said oil filter to drain from said oil filter held by said oil filter holder through said at least one drain hole into said container interior volume of said recyclable container, said oil filter holder also having an oil filter securing device to define and isolate said first holder interior volume from said second holder interior volume and to prevent movement of said oil filter.

12. The recycling apparatus of claim 11, wherein said oil filter holder has a curved upper lip to prevent said motor oil from splashing out of said oil filter holder when transporting said recyclable container holding said motor oil and emptying said motor oil from an internal combustion engine.

13. The recycling apparatus of claim 11, wherein said recycling apparatus further comprises an additional storage compartment connected to said recyclable container to house items selected from the group consisting of air filters, PVC filters, tools, rags, spark plugs, and new quarts of oil.

14. The system of claim 1, further comprising a curved drain attached to said housing to catch said motor oil drained from an engine, so that said motor oil drained from said engine travels down said curved drain into said container interior volume via said at least one drain hole.

15. The system of claim 14, wherein at least one rod is positioned on said curved drain and extends from said curved drain to hold a motor oil container upside down to drain motor oil from said motor oil container.

16. The recycling apparatus of claim 11, wherein said recyclable container has a rectangular top surface with four sides, said rectangular top surface with four sides having at least two handles positioned on opposite sides of said rectangular top surface with four sides, said oil filter holder attached to said rectangular top surface.

17. The system of claim 1, wherein said depth is sufficiently deep enough to secure said first oil filter in place and to prevent said first oil filter from turning over and said motor oil from spilling during transportation to recycling centers.

18. The recycling apparatus of claim 11, further comprised a curved drain attached to said recyclable container and to said oil filter holder to catch said motor oil drained from the engine, so that said motor oil drained from said engine travels down said curved drain to be drained from said engine into said container interior volume via said at least one drain hole.

19. The recycling apparatus of claim 18, further comprising at least one rod positioned on said curved drain extending outward from said curved drain so that motor oil bottles can be held upside down on said at least one rod to drain said motor oil from said motor oil bottles into said container interior volume.

20. The recycling apparatus of claim 19, wherein said motor oil bottles are high density polyethylene plastic bottles.

21. The system of claim 5, wherein said housing is attached to said substantially rectangular top surface.

22. The system of claim 7, wherein a first notch of said at least one notch is positioned opposite to a second notch of said at least one notch, said first notch and said second notch extending towards one another.

23. The system of claim 21, wherein said first notch and said second notch are not joined together.

24. The system of claim 1, further comprising:
   (c) an oil container securing structure to hold at least one oil container in a position to encourage motor oil in said at least one oil container to drain from said at least one oil container secured by said oil container securing structure through said at least one drain hole into said container interior volume of said container, said oil container securing structure attached to said housing and to said container.

25. The system of claim 23, wherein said oil container securing structure is a rod extending away from at least one drain hole and said container, said rod fitting inside one oil container of said at least one oil container.

26. The system of claim 1, wherein said interior surfaces comprise a bottom surface and a side surface.

27. The system of claim 25, wherein said securing structure is positioned on said side surface and said at least one drain hole is positioned in said bottom surface.

28. The recycling apparatus of claim 11, wherein said securing structure comprises at least one notch extending from one surface of said plurality of interior surfaces, said at least one notch positioned to hold said oil filter firmly in place when said oil filter is placed in one recess of said plurality of recesses.

29. The recycling apparatus of claim 27, wherein one first notch of said at least one notch is positioned opposite to another second notch of said at least one notch, and first notch extending towards said second notch.

30. The recycling apparatus of claim 28, wherein said first notch and said second notch are not joined together.

31. An apparatus, comprising:
   (a) a container having a container interior volume for holding motor oil;
   (b) a housing having interior surfaces defining a housing interior volume, said interior surfaces forming at least two recesses, each recess having a cross-sectional area that is slightly larger than a oil filter cross-sectional area, each recess having a depth sufficiently deep to secure an oil filter in place, said housing and said container having at least one drain hole positioned therein that are physically linked to said container interior volume, said housing holding said oil filter upside down to drain motor oil in said oil filter into said container interior volume via said at least one drain hole;

(c) a securing structure to define each cross-sectional area of each recess to prevent movement of said oil filter;

(d) a curved drain to catch motor oil drained from an engine; and (e) an oil container securing structure to hold at least one oil container upside down to drain motor oil in said oil container into said container interior volume via said at least one drain hole, wherein said container, said housing, said securing structure, said curved drain, and said oil container securing structure are attached together.

32. The apparatus of claim 30, wherein said securing structure comprises at least one notch extending from said interior surfaces, said at least one notch positioned to hold said oil filter firmly in place when said oil filter is placed in one recess of said recesses and wherein said oil container securing structure comprises a rod extending away from said recyclable container, said rod fitting inside one oil container of said at least one oil container.

33. The apparatus of claim 30, wherein said plurality of interior surfaces comprises a bottom surface and a side surface.

34. The apparatus of claim 32, wherein said securing structure is positioned on said side surface and said at least one drain hole is positioned in said bottom surface.

35. The recycling apparatus of claim 1, further comprising:

(c) an oil container securing structure to hold at least one oil container in a position to encourage motor oil in said at least one oil container to drain from said at least one oil container secured by said oil container securing structure through said at least one drain hole into said container interior volume of said recyclable container, said oil container securing structure attached to said oil filter holder and to said container.

* * * * *